No. 679,177. Patented July 23, 1901.
C. E. LYKKE.
CORN CHOPPER.
(Application filed Feb. 8, 1900.)
(No Model.) 3 Sheets—Sheet 1.
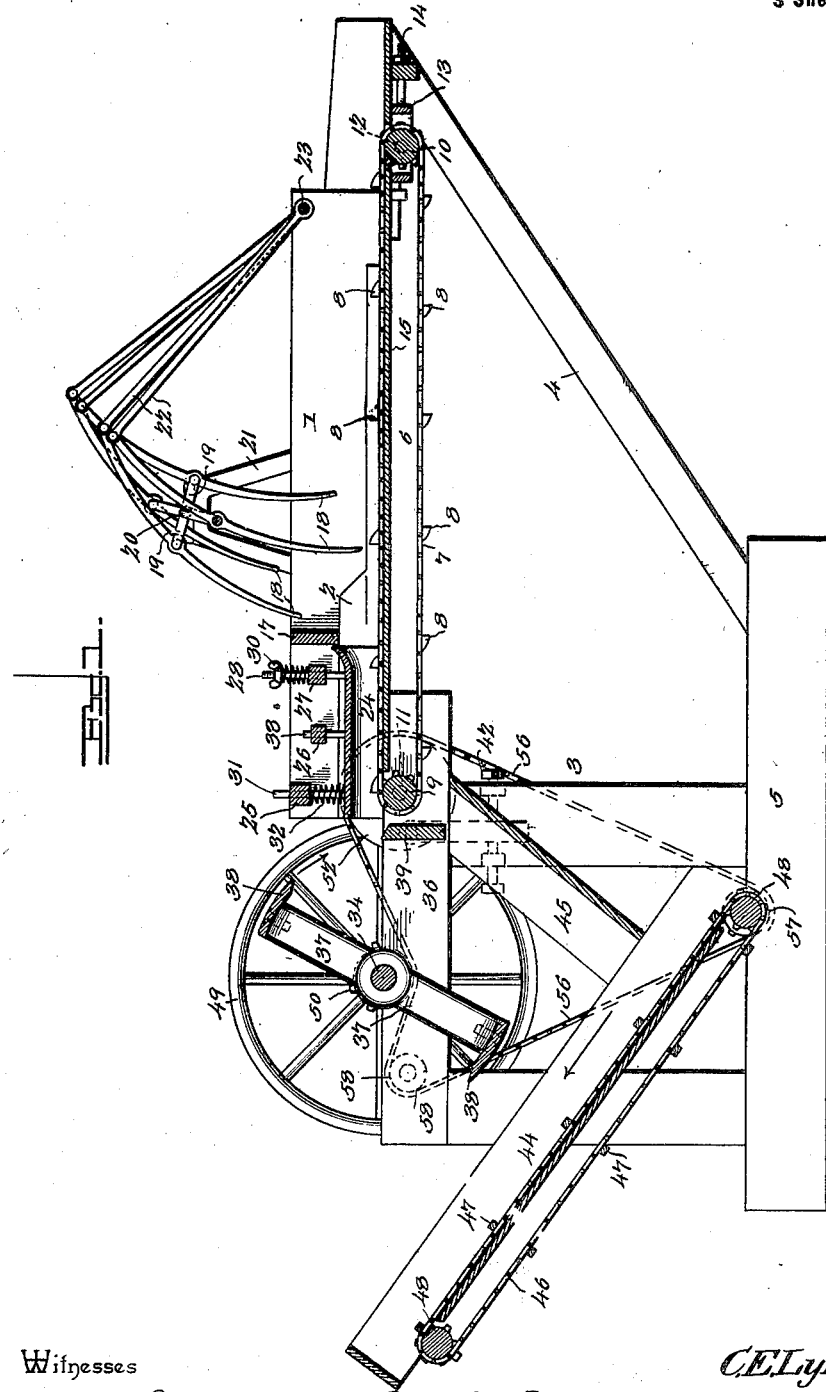
Witnesses
C. E. Lykke Inventor
By his Attorneys,

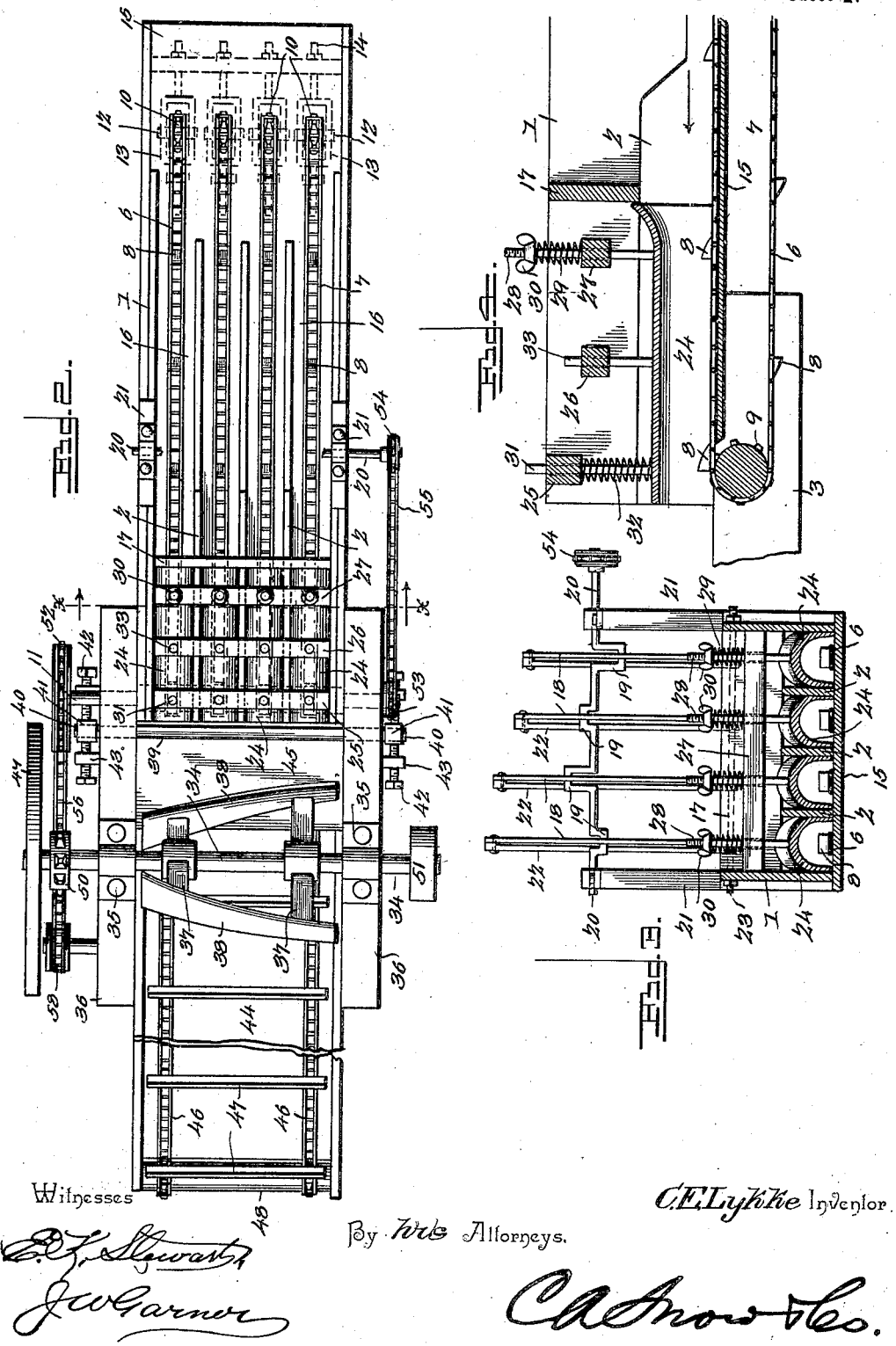

No. 679,177. Patented July 23, 1901.
C. E. LYKKE.
CORN CHOPPER.
(Application filed Feb. 8, 1900.)
(No Model.) 3 Sheets—Sheet 3.
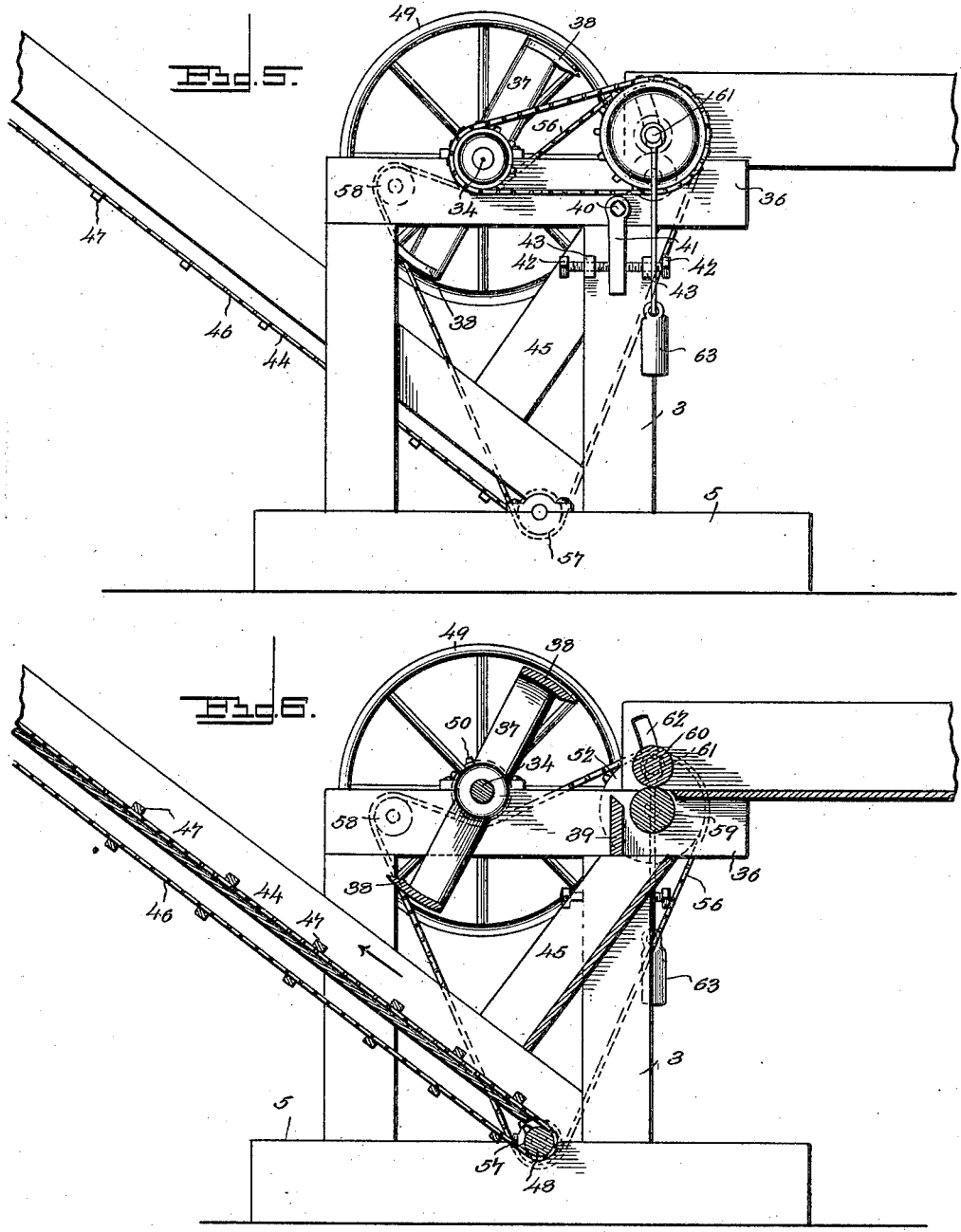

UNITED STATES PATENT OFFICE.

CHRISTIAN E. LYKKE, OF GRAND ISLAND, NEBRASKA.

CORN-CHOPPER.

SPECIFICATION forming part of Letters Patent No. 679,177, dated July 23, 1901.

Application filed February 8, 1900. Serial No. 4,541. (No model.)

*To all whom it may concern:*

Be it known that I, CHRISTIAN E. LYKKE, a citizen of the United States, residing at Grand Island, in the county of Hall and State of Nebraska, have invented a new and useful Corn-Chopper, of which the following is a specification.

My invention is an improved corn-chopper adapted for chopping or cutting corn-fodder and ear-corn.

One object of my invention is to provide means for feeding fodder and ear-corn endwise to the cutter mechanism and to firmly hold the same while being cut.

A further object of my invention is to provide means for preventing the feed mechanism from being choked.

A further object of my invention is to provide cutter mechanism which can be adjusted to take up wear and which is self-sharpening.

A further object of my invention is to combine with the cutter mechanism an endless carrier mechanism adapted to convey the chopped or cut fodder or ear-corn from the cutter mechanism and deliver the same to a suitable receptacle, as a wagon or the like.

My invention consists in the peculiar construction and combination of devices hereinafter fully set forth, and pointed out in the claims.

In the accompanying drawings, Figure 1 is a vertical longitudinal central sectional view of a corn-chopper embodying my improvements. Fig. 2 is a top plan view of the same with the rake-fingers and the operating mechanism therefor removed, a portion of the revoluble shaft for operating said rake-fingers being shown. Fig. 3 is a vertical transverse sectional view taken on the line $x$ $x$ of Fig. 2 and looking in the direction indicated by the arrow. Fig. 4 is a detail longitudinal sectional view. Fig. 5 is a side elevation of a modified form of my improved corn-chopping machine. Fig. 6 is a vertical longitudinal central sectional view of the same.

In the embodiment of my invention a cutting-box 1 is provided in its lower side with a series of parallel longitudinally-disposed partition-boards 2, which form a series of longitudinal guideways 16 between them in the bottom of the cutter-box. Said guideways form channels for the passage of ears of corn or cornstalks to the cutting mechanism. One end of the cutter-box is supported by a frame 3 of suitable construction, and the outer end of the cutter-box is supported by inclined brace-bars 4, the lower ends of which are secured to the sills 5 of the frame. Disposed in the guideways in the bottom of the cutter-box are a series of endless feed-carriers 6, each of which comprises an endless chain 7, having projecting spurs 8, and said endless chains are supported by sprocket-wheels 9 10, mounted on shafts 11 12 at opposite ends of the cutter-box, said shafts being journaled in suitable bearings, as shown. The bearings 13 of the shaft 12 are longitudinally adjustable and provided with adjusting-bolts 14, the function of which, as will be readily understood, is to tighten and take up slack in the chains. The upper leads of said endless chains travel on the bottom board 15 of the cutter-box in the guideways 16. The partition-boards 2 are higher as they approach the discharge end of the cutter-box than they are at the opposite end thereof, and transversely disposed over the said partition-boards, at the heightened portions thereof and at a suitable distance from the discharge end of the cutter-box, is a gate-board 17, the function of which is to regulate the quantity of corn-fodder conveyed by the endless feed-carriers to the cutter mechanism, and where the corn-chopper is employed for chopping or cutting ear-corn into short lengths the said gate-board prevents more than one ear of corn from being conveyed at one time to the cutter mechanism by any one of the endless feed-carriers.

It will be understood that the parallel arrangement of the endless feed-carriers and the longitudinal guideways in which they are disposed in the bottom of the cutter-box, in connection with the rake-back mechanism herein described, cause the stalks of fodder and the ears of corn thrown or fed into the cutter-box to assume a parallel relation and to be fed endwise to the cutter mechanism through the channels formed by the said guideways.

In order to prevent an undue accumulation of fodder or ear-corn on the endless feed-carriers at the point where the latter pass under the transversely-disposed gate, I provide a series of rake-fingers 18. Said rake-fingers are preferably curved in form and are centrally pivoted upon a series of cranks 19, with which a shaft 20 is provided. The said shaft is arranged transversely over the cutter-box and is journaled in bearings on a pair of suitable brackets, as at 21, with which the cutter-box is provided, and there are as many of the rake-fingers as there are endless feed-carriers in the cutter-box, one of said rake-fingers being disposed above one of said endless feed-carriers in series. The upper ends of the rake-fingers are pivotally jointed to link-rods 22, which link-rods have their outer ends pivoted at a fixed point (as here shown near the outer end of the cutter-box) on a rod 23. It will be understood from the foregoing that when the shaft 20 is rotated reciprocating rotary motion will be communicated to the lower ends of the rake-fingers and that the same will rake rearwardly on the mass of fodder or ear-corn in the cutter-box and prevent an excessive quantity thereof from passing under and choking the spaces between the guideways and the gate 17. The said rake-fingers, also in coaction with the said guideways and endless carriers, effect parallel arrangement of the fodder and ear-corn on which they operate.

It will be understood by reference to Fig. 1 that the lower ends of the rake-fingers when the same are at the lower limits of their strokes are at a sufficient height above the endless feed-carriers to admit of the passage of an ear of corn under them, and hence said rake-fingers will not operate upon ear-corn lying directly on the endless feed-carriers or upon stalks of corn-fodder lying directly on said endless feed-carriers; but said rake-fingers will serve effectually to remove any superincumbent ears of corn or stalks of corn-fodder and prevent the same from passing under the gate 17, and hence prevent choking of the feed mechanism.

A series of concave holders 24 are disposed between the gate 17 and the discharge end of the cutter-box and are arranged in the guideways 16 and span or arch over the upper leads of the endless feed-carriers, as shown in Fig. 3. The said concave holders serve to retain the corn-fodder or ears of corn in place while the same are being cut or chopped in short lengths by the cutter mechanism. Cross-bars 25 26 27 are disposed over the concave holders and connect the sides of the cutter-box. Supporting-rods 28 extend upward from the feed ends of the concave holders, pass through and are adapted to travel in openings in the bar 27, and on the upper portions of said rods are tension-springs 29, which serve to support the feed ends of the concave holders and are secured in position by thumb-nuts 30. Rods 31 rise from the opposite ends of the concave holders and extend through openings in the bar 25, and between said bar and the upper side of said concave holders are bearing-springs 32, which are placed on said rods 31 and serve to depress the concave holders on the fodder or ear-corn as the same is presented to the action of the cutter mechanism, so as to hold the fodder or ears of corn firmly while being cut. Guide-rods 33, which rise from the central portions of the concave holders, pass through openings in the cross-bar 26. A cutter-shaft 34 is journaled in suitable bearings, as at 35, mounted on the plates 36 of frames 3 and is provided with radial arms 37, the outer ends of which are connected by horizontally-disposed obliquely-arranged shear blades or plates 38. A relatively fixed ledger-plate 39 is disposed at the discharge end of the cutter-box and tangentially with relation to the circular path of the revoluble cutter blades or plates 38 and coacts with the latter to chop or cut the corn-fodder or ears of corn when the machine is in operation. The said ledger-plate 39 is provided with projecting spindles or trunnions 40 at its ends, which are journaled in and project beyond suitable bearings in the plates 36 of frames 3, thereby pivotally mounting said relatively-fixed tangentially-disposed ledger-plate. The ends of the spindles or trunnions of the latter are provided with adjusting-arms 41, which depend therefrom and are engaged on opposite sides by adjusting-bolts 42, which are mounted in suitable lugs 43, with which side frames 3 are provided. The function of said adjusting-arms and said adjusting-bolts is to adjust the cutting edge on the upper side of the ledger-plate 39 with relation to the revoluble cutter-plates and to compensate for wear. It will be understood by reference to the drawings that said cutters are self-sharpening, the friction between them serving to always maintain sharpened cutting edges.

An endless elevator or carrier 44 is supported between the frames 3. The lower portion of said endless carrier is disposed under the cutting mechanism at a suitable distance below the same, and a chute or delivery-board 45 is arranged under the discharge end of the cutter-box and under the cutter mechanism and extends to a point above the lower side of the endless carrier 44. The latter is of the usual construction, composed of the connected endless belts or chains 46, having the cross-slats 47, and operated and carried by the roller-shafts 48 49, which have sprocket-wheels that engage the sprocket-chains 46. A fly-wheel 49 is keyed to one end of the shaft 34, a sprocket-wheel 50 is also keyed to said shaft near said wheel 49, and to the opposite end of said shaft is keyed a power-pulley 51. A sprocket-wheel 52 is keyed to one end of the operating-shaft 11 of the endless feed-carriers, a sprocket-wheel 53 being keyed to the opposite ends of said shaft, which sprocket-wheel 52 is connected to a sprocket-wheel 54 on one end of shaft 20 by an endless sprocket-chain 55. An endless sprocket-chain 56 connects the sprocket-wheel 52, a sprocket-wheel 57 on the operating-shaft of the endless carrier 44 and an idle sprocket-wheel 58, which is journaled on a suitable support with which one of the frames 3 is provided, and said endless sprocket-chain 56 engages the sprocket-wheel 50, and hence motion is imparted thereto by the rotation of the revoluble cutter-shaft, and the endless feed-carriers and carriers 44 are caused to travel in the direction indicated by the arrows, and motion is also communicated to the series of rake-fingers, as hereinbefore described.

In Figs. 5 and 6 I illustrate a modified form of my invention, in which I dispense with the endless feed-carriers and concave holders and employ in lieu thereof a pair of feed-rollers 59 60. The lower roller 59 is journaled in fixed bearings and the upper roller 60 has projecting trunnions or spindles 61, which are journaled and are adapted to travel in curved guideways 62, with which the sides of the cutter-box are provided. Weights 63 depend from the ends of said spindles or trunnions and serve to press the roller 60 firmly on the roller 59. When thus arranged, my improved chopper is especially adapted for chopping corn-fodder.

Having thus described my invention, I claim—

In a corn-chopper, the combination of a box having a series of longitudinally-disposed guideways in the bottom thereof, said guideways forming channels for the passage of ears of corn and cornstalks to the cutter mechanism, feed-carriers in the bottoms of said guideways, a cutter mechanism at the discharge end of said box, concave holders in said guideways adjacent to said cutter mechanism, a transversely-disposed gate at the receiving ends of the concave holders, and a rake-back mechanism, operating immediately above the said guideways and in advance of said gate, substantially as described.

In testimony that I claim the foregoing as my own I have hereto affixed my signature in the presence of two witnesses.

CHRISTIAN E. LYKKE.

Witnesses:
F. C. HANAFORD,
C. F. BENTLEY.